(12) United States Patent
Hasegawa

(10) Patent No.: US 6,744,479 B2
(45) Date of Patent: Jun. 1, 2004

(54) ACTIVE MATRIX DISPLAY DEVICE

(75) Inventor: Atsushi Hasegawa, Togane (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 09/919,916

(22) Filed: Aug. 2, 2001

(65) Prior Publication Data
US 2002/0021380 A1 Feb. 21, 2002

(30) Foreign Application Priority Data
Aug. 9, 2000 (JP) ........................................ 2000-241472

(51) Int. Cl.$^7$ .................... G02F 1/136; G02F 1/1343
(52) U.S. Cl. ...................... 349/43; 349/46; 349/147
(58) Field of Search ............................. 349/43, 46, 147

(56) References Cited

U.S. PATENT DOCUMENTS 5,563,427 A * 10/1996 Yudasaka et al.
5,585,290 A * 12/1996 Yamamoto et al.
6,067,132 A    5/2000 Kim
6,528,824 B2 * 3/2003 Yamagata et al.

* cited by examiner

Primary Examiner—Ha Tran Nguyen
(74) Attorney, Agent, or Firm—Reed Smith LLP; Stanley P. Fisher, Esq.; Juan Carlos A. Marquez, Esq.

(57) ABSTRACT

An active matrix display device is provided a display area including a set of pixel regions each having a first thin-film transistor, and a driving circuit forming area located outside the display area and having second thin-film transistors. A gate electrode of the first thin-film transistor is made of a material different than a gate signal line and has a portion that is directly laid on or under the gate signal line to establish electrical connection. A gate electrode of each of the second thin-film transistors is made of a material different than a wiring layer or electrode to be connected to it and has a portion that is directly laid on or under the wiring layer or electrode to establish electrical connection. The gate electrode of the first thin-film transistor is made of the same material as that of each of the second thin-film transistors. The gate signal line is made of the same material as the wiring layer or electrode.

4 Claims, 5 Drawing Sheets

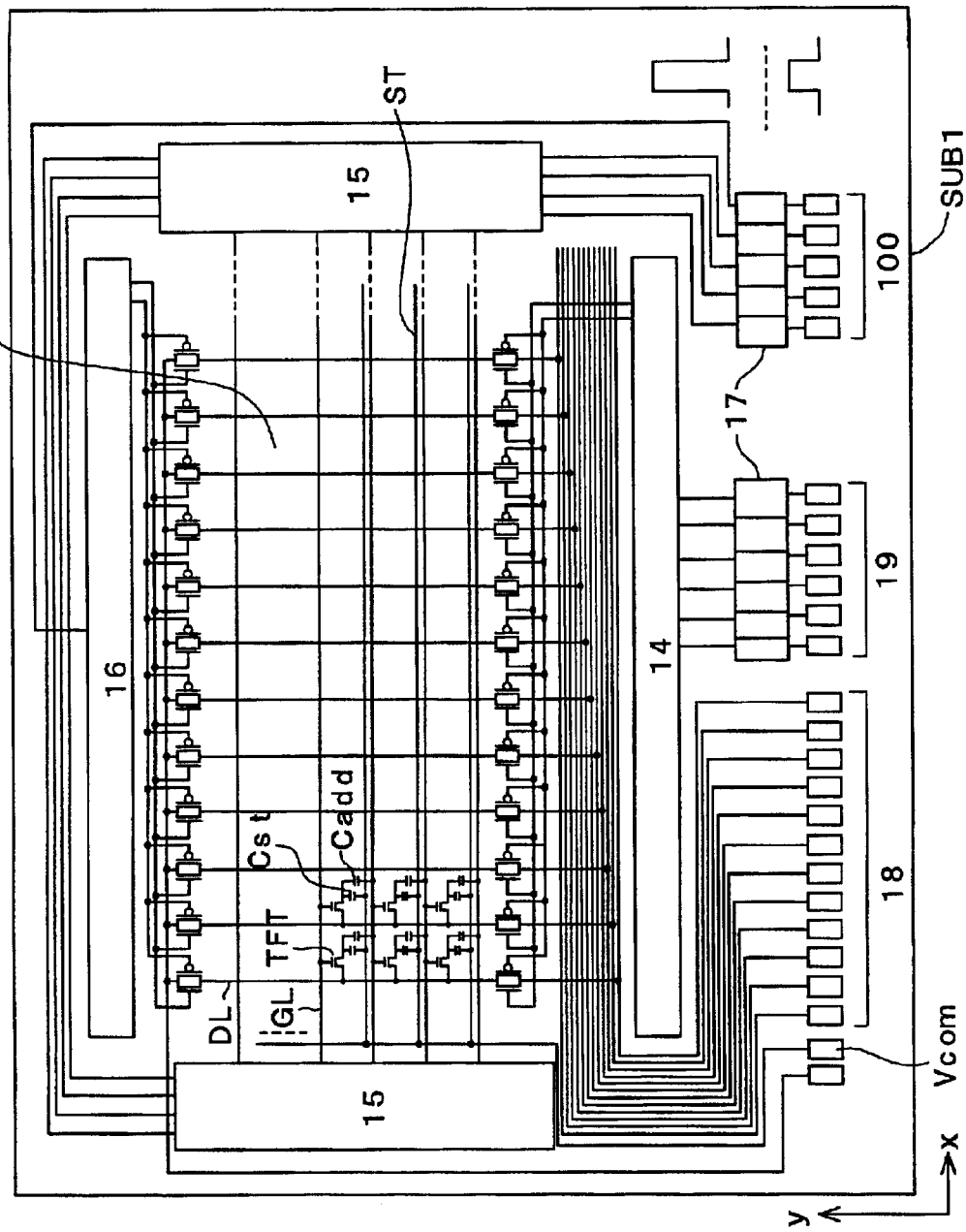

ACTIVE MATRIX DISPLAY DEVICE

BACKGROUND OF THE INVENTION

1. Field of the Invention

The present invention relates to an active matrix display device.

2. Description of the Related Art

In liquid crystal display device that is one of active matrix devices, substrates that are opposed to each other with a liquid crystal interposed in between are used as a container and an area that extends parallel with the liquid crystal and where a number of pixels are arranged serves as a display area.

Active matrix display devices are such that the regions enclosed by gate signal lines that extend in the x direction and are arranged in the y direction and drain signal lines that extend in the y direction and are arranged in the x direction are made pixel regions. Each pixel region is provided with a thin-film transistor that is driven being supplied with a scanning signal from a gate signal line on one side and a pixel electrode that is supplied with a video signal from a drain signal line on one side via the thin-film transistor. All of the above components are formed by film forming technologies.

Further, there are known active matrix display devices of a type in which a gate signal line driving circuit for supplying scanning signals to the gate signal lines and a drain signal line driving circuit for supplying video signals to the drain signal lines are formed by film forming technologies in regions other than the display area on a substrate on which the thin-film transistors are formed.

The above gate signal line driving circuit and drain signal line driving circuit includes a number of inverters that are formed by thin-film transistors configured in the same manner as the above-mentioned thin-film transistors, and hence it is an ordinary procedure to form those driving circuits and the pixels in parallel.

However, in active matrix display devices of the above type, it is pointed out that the gate signal line driving circuit and the drain signal line driving circuit occupies large areas, as a result of which the distance between the outline of the display area and that of a transparent substrate (i.e., a frame width) becomes long.

SUMMARY OF THE INVENTION

The present invention has been made in view of the above circumstances in the art, and an object of the invention is therefore to provide a active matrix display device in which the integration densities of the gate signal line driving circuit and the drain signal line driving circuit are increased.

Representative parts of the invention will be described below briefly.

The invention provides an active matrix display device comprising a substrate having a display area including a set of pixel regions each having a first thin-film transistor; and a driving circuit forming area located outside the display area and having second thin-film transistors, wherein a gate electrode of the first thin-film transistor is made of a material different than a gate signal line and has a portion that is electrically connected to the gate signal line; a gate electrode of each of the second thin-film transistors is made of a material different than a wiring layer or electrode to be connected to it and has a portion that is electrically connected to the wiring layer or electrode; the gate electrode of the first thin-film transistor is made of the same material as that of each of the second thin-film transistors; and the gate signal line is made of the same material as the wiring layer or electrode.

The gate electrode of the first thin-film transistor and/or each of the second thin-film transistors may be laid directly or indirectly on or under the gate signal line.

The gate electrode of the first thin-film transistor and/or each of the second thin-film transistors may have a portion that is formed with a material the same as or different than the gate signal line in a layer different than the gate signal line.

In the above active matrix display device, the gate electrode of each second thin-film transistor formed in the driving circuit forming area is connected to another wiring layer or electrode in such a manner as to be directly laid on or under the latter without intervention of a contact hole.

Therefore, there is no need for securing space for formation of a contact hole, making it possible to narrow the driving circuit forming area.

With the above configuration, the threshold voltages of the first thin-film transistors in the respective pixel regions and the second thin-film transistors can be equalized by giving those two kinds of thin-film transistors the same structure (forming their gate electrodes with the same material).

BRIEF DESCRIPTION OF THE DRAWINGS

FIG. 2 is an equivalent circuit diagram of a liquid crystal active matrix display device according to the first embodiment;

DESCRIPTION OF THE PREFERRED EMBODIMENTS

Figure 1A:
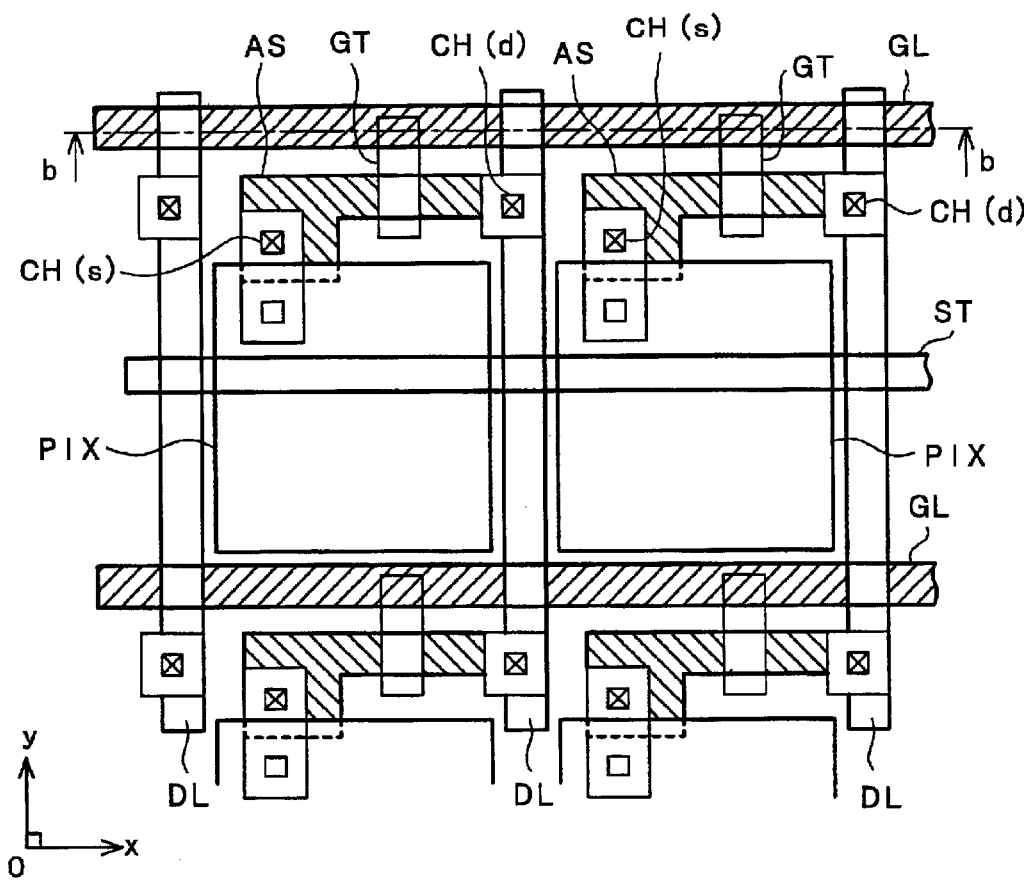
FIG. 1A is a plan view showing the structure of each pixel of a liquid crystal active matrix display device according to a first embodiment of the invention.

Active matrix display devices according to embodiments of the present invention will be hereinafter described with reference to the accompanying drawings.

Embodiment 1

Entire Configuration

FIG. 2 is an equivalent circuit diagram showing a liquid crystal display device that is one type of active matrix display devices according to a first embodiment of the invention. Although FIG. 2 is a circuit diagram, it is so drawn as to correspond to an actual geometrical arrangement.

A transparent substrate SUB1 is shown in FIG. 2. The transparent substrate SUB1 is opposed to the other transparent substrate (not shown) with a liquid crystal interposed in between.

Gate signal lines GL that extend in the x direction and are arranged in the y direction and drain signal lines DL that extend in the y direction and are arranged in the x direction (the directions x and y are shown in FIG. 2) are formed in a central area on the liquid-crystal-side surface of the transparent substrate SUB1. The regions enclosed by the signal lines GL and DL are pixel regions.

A number of pixel regions are arranged in matrix form and thereby form a display area 13.

A storage capacitor electrode line ST extending in the X direction is formed between each gate signal line GL and the other gate signal line GL adjacent to it. In each pixel region, the storage capacitor electrode line ST serves as one storage capacitor electrode of a storage capacitor element Cst (described later).

Each pixel region is provided with a thin-film transistor TFT that is driven being supplied with a scanning signal from the one gate signal line GL (on the top side in FIG. 2) and a transparent pixel electrode PIX that is supplied with a video signal from the one drain signal line (on the left side in FIG. 2) via the thin-thin transistor TFT. The storage capacitor element Cst is formed by the pixel electrode PIX and the above-mentioned storage capacitor electrode line ST. Another storage capacitor element Cadd is formed by the pixel electrode PIX and the other gate signal line GL. Although in this embodiment each pixel region is provided with the two storage capacitor elements Cst and Cadd, the invention is not limited to such a case and only one of those may be formed.

The two ends (the left end and the right end in FIG. 2) of each gate signal line GL are connected to respective gate signal line driving circuits 15 that are formed on the transparent substrate SUB1. Scanning signal pulses that are output from the gate signal line driving circuits 15 are supplied sequentially to the respective gate signal lines GL.

The gate signal line driving circuits 15, which include a number of complementary MOS (CMOS) inverters, are formed parallel with formation of the components in the pixel regions by film forming technologies.

One end (on the bottom side in FIG. 2) of each drain signal line DL is connected to a drain signal line driving circuit 14 that is formed on the transparent substrate SUB1. The drain signal lines DL are supplied with video signal pulses in synchronism with a scanning signal pulse.

The drain signal line driving circuit 14, which also includes a number of complementary MOS (CMOS) inverters, is also formed parallel with formation of the components in the pixel regions by film forming technologies.

One end (on the left side in FIG. 2) of each storage capacitor electrode line ST is connected to a terminal Vcom.

The terminal Vcom is aligned with input terminals 18, 19, and 100 that are formed on a peripheral portion of the transparent substrate SUB1, and is given the same potential as a transparent counter electrode (not shown; common to the pixel regions) that is formed on the liquid-crystal-side surface of the other transparent substrate that is opposed to the transparent substrate SUB1. Although in the embodiment the storage capacitor electrode lines ST are connected to the terminal Vcom, the invention is not limited to such a case and the storage capacitor electrode lines ST may be given another, arbitrary voltage.

In FIG. 2, reference numeral 16 denotes a pre-charging circuit for charging the drain signal lines DL for supply of video signals. Reference numeral 17 denotes level shift circuits 17 for converting digital signals (control signals) that are supplied via the input terminals 19 and 100 into voltages that are high enough to allow proper operation of the gate signal line driving circuits 15 and the drain signal line driving circuit 14.

The other transparent substrate (not shown) that is opposed, with the liquid crystal interposed in between, to the transparent substrate SUB1 on which the above circuits are formed is so disposed as to cover at least the display area 13. A sealing member (not shown) that seals the liquid crystal and fixing the two substrates to each other is formed on a peripheral portion of the other substrate.

A transparent counter electrode that is common to the pixel regions is formed on the liquid-crystal-side surface of the other transparent substrate. Electric fields to act on the liquid crystal are formed between the counter electrode and the pixel electrodes PIX that are formed on the transparent substrate SUB1.

Structure of Pixel

Figure 1B:
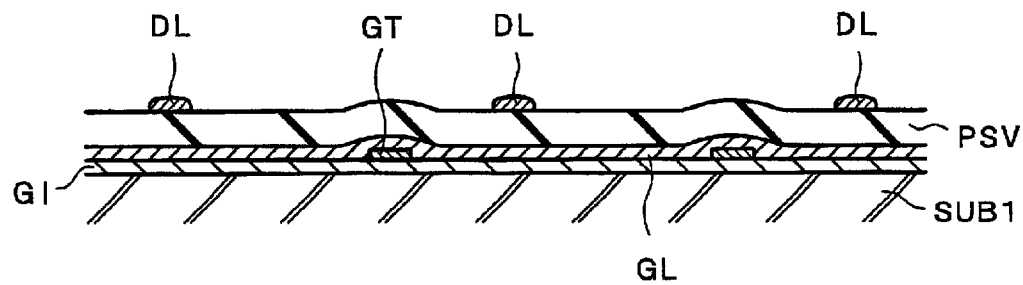
FIG. 1B is a sectional view taken along line b—b in FIG. 1A.

FIG. 1A is a plan view showing the structure of each pixel according to the first embodiment. Specifically, FIG. 1A shows two pixels that are arranged in the x direction. FIG. 1B is a sectional view taken along line b—b in FIG. 1A.

First, a semiconductor layer AS is formed in each pixel region on the liquid-crystal-side surface of the transparent substrate SUB1. The semiconductor layer AS, which will become the semiconductor layer of a thin-film transistor TFT, is made of polysilicon, for example.

The semiconductor layer AS is closer to and extends parallel with the top-side one of two gate signal lines GL (described later) that separate the pixel region concerned from other pixel regions.

Then, an insulating film GI is formed with $SiO_2$, for example, on the entire surface of the transparent substrate SUB1 so as to cover even the semiconductor layers AS. The insulating film GI will serve as a gate oxide film of each thin-film transistor TFT.

A gate electrode GT of the thin-film transistor TFT is formed with TiW, for example, on the surface of the insulating film GI. The gate electrode GT crosses the associated semiconductor layer AS approximately at its center, and the gate electrode GT extends upward so as to overlap with the associated top-side gate signal line GL (described later).

The semiconductor layer AS is intrinsic (i.e., it is not doped with any conductivity type determining impurity) when it is formed. After formation of the gate electrode GT, a conductivity type determining impurity is introduced with the gate electrode GT used as a mask, whereby the portions of the semiconductor layer AS on both sides of the gate electrode GT are made conductive, that is, a source region and a drain region are formed.

Then, the gate signal lines GL are formed with Al, for example, on the surface of the insulating film GI so as to extend in the x direction and to be arranged in the y direction. Each gate signal line GL overlaps with and is thereby electrically connected to the associated gate electrodes GT.

It is conceivable to form each gate signal line GL integrally with the associated gate electrodes GT and form the gate electrodes GT with the same material as the gate signal line GL, that is, Al. However, in this embodiment, the gate electrodes GT and the gate signal lines GL are made of different materials.

This is to make the threshold voltage (Vth) of the thin-film transistors TFT in the pixel regions equal to that of the thin-film transistors of the inverters constituting the drain signal line driving circuit 14 and the gate signal line driving circuits 15 that are formed parallel with the thin-film transistors TFT.

The storage capacitor electrode lines ST are formed with Al between the gate signal lines GL simultaneously with the formation of the latter. Each storage capacitor electrode line ST forms a capacitor with the associated pixel electrode PIX (described later). Although not described in detail, to increase the capacitance of the other storage capacitor Cadd that is formed by each pixel electrode PIX and the associated bottom-side gate signal line GL, each pixel electrode PIX may be overlapped with the associated bottom-side gate signal line GL.

After the formation of the gate signal lines GL (gate electrodes GT) and the storage capacitor electrode lines ST, the insulating film GI is etched with the gate signal lines GL and the storage capacitor electrode lines ST used as a mask. As a result, the insulating film GI remains only directly under the gate signal lines GL (gate electrodes GT) and the storage capacitor electrode lines ST and the surface of each semiconductor layer AS is exposed except for its portion under the associated gate electrode GT.

The etching of the insulating film GI may be performed after the formation of the gate electrodes GT and before the formation of the gate signal lines GL and the storage capacitor electrode lines ST. In this case, the insulating film GI remains only directly under the gate electrodes GT.

Then, a passivation film PSV is formed with SiN, for example, so as to cover not only the surfaces of the insulating film GI on which the gate signal lines GL and the storage capacitor electrode lines ST are formed but also the other signal lines and wiring.

Contact holes CH(s) and CH(d) for exposing parts of the surfaces of the source region and the drain region of each thin-film transistor TFT are formed through the passivation film PSV.

The contact hole CH(d) for exposing part of the surface of the drain region (the region to be connected to an associated right-side drain signal line DL (described later) is called "drain region") of the associated thin-film transistor TFT is formed in the region where the right-side drain signal line DL is to be formed. With this measure, the right-side drain signal line DL is electrically connected to the drain region of the thin-film transistor TFT when the former is formed.

Pixel electrodes PIX are formed with ITO (indium tin oxide) on the surface of the passivation film PSV.

Each pixel electrode PIX is formed in most of the associated pixel region so as to overlap with the associated storage capacitor electrode line ST. As a result, a capacitor element having part of the passivation film PSV as a dielectric film is formed between each pixel electrode PIX and the associated storage capacitor electrode line ST.

Further, drain signal lines DL that extend in the y direction and are arranged in the x direction are formed with Al, for example, on the surface of the passivation film PSV, and are automatically connected electrically to the drain regions of the thin-film transistors TFT through the contact holes CH(d).

Simultaneously with the formation of the drain signal lines DL, a conductive layer is formed with Al so as to be connected to the source region of the associated thin-film transistor TFT via the contact hole CH(s) at one end and to be connected to the associated pixel electrode PIX at the other end.

An alignment layer (not shown) is formed in the entire display area on the surface of the transparent substrate SUB1 on which the above components are formed. The alignment layer directly contacts the liquid crystal and thereby determines its initial alignment direction.

Inverters of Driving Circuits

Figure 3:
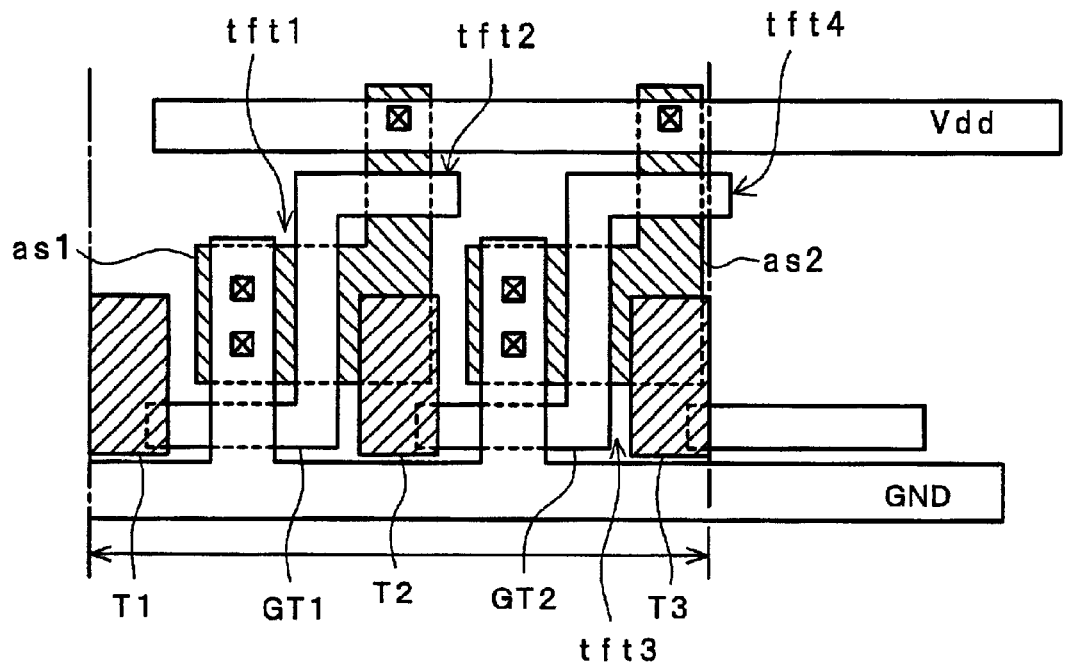
FIG. 3 is a plan view showing each of inverters that constitute driving circuits of the liquid crystal display device according to the first embodiment.

FIG. 3 is a plan view showing each of the inverters according to the first embodiment that constitute the drain signal line driving circuit 14 and the gate signal line driving circuits 15.

Figure 5:
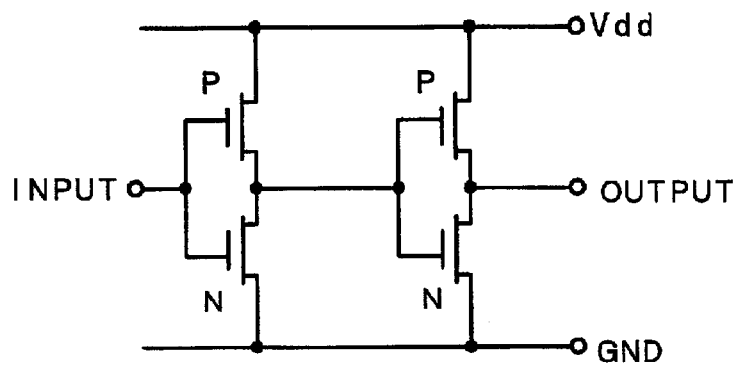
FIG. 5 is an equivalent circuit diagram of each of the inverters that constitute the driving circuits of the liquid crystal display device according to the first embodiment.

FIG. 5 is an equivalent circuit diagram of each inverter. A front-stage complementary MOS (CMOS) transistor and a rear-stage complementary MOS (CMOS) transistor are connected to a power supply line Vdd and a ground line GND. The connecting point of the front stage CMOS transistor is connected to the gate of the rear-stage CMOS transistor. The gate of the gate of the front-stage CMOS transistor is an input terminal and the connecting point of the rear-stage CMOS transistor is an output terminal.

As shown in FIG. 3, first, semiconductor layers as1 and as2 are formed on the surface of the transparent substrate SUB1.

The semiconductor layer as1 will serve as respective semiconductor layers of an n-type thin-film transistor tft1 and a p-type thin-film transistor tft2, and is a pattern that has a bent portion at the boundary between the thin-film transistors tft1 and tft2.

Similarly, the semiconductor layer as2 will serve as respective semiconductor layers of an n-type thin-film transistor tft3 and a p-type thin-film transistor tft4, and is a pattern that has a bent portion at the boundary between the thin-film transistors tft3 and tft4.

The semiconductor layers as1 and as2 are formed in the same manufacturing step as the semiconductor layers AS of the thin-film transistors TFT are formed in the respective pixel regions.

A gate electrode GT1 is formed with TiW on the surface of the semiconductor layer as1 so as to traverse each of the n-type thin-film transistor tft1 and the p-type thin-film transistor tft2 at the center. A gate electrode GT2 is formed with TiW in the same manner on the surface of the semiconductor layer as2.

The gate electrodes GT1 and GT2 are formed in the same manufacturing step as the gate electrodes GT of the thin-film transistors TFT are formed in the respective pixel regions.

Gate oxide films that are $SiO_2$ films are formed on those portions of the surfaces of the semiconductor layers as1 and as2 which are located under the gate electrodes GT1 and GT2, and are not formed in the other regions. This is because those portion of the $SiO_2$ film which are not under the gate electrodes GT1 and GT2 are etched away with the gate electrodes GT1 and GT2 used as a mask in the same manner as the thin-film transistors TFT are formed in the respective pixel regions.

Then, source regions and drain regions of the respective thin-film transistors tft1-tft4 are formed by doping those portions of the semiconductor layers as1 and as2 which are not under the gate electrodes GT1 and GT2 with impurities for proper conductivity types.

Since the n-type thin-film transistor tft1 and the p-type thin-film transistor tft2 are formed by using the semiconductor layer as1 and the n-type thin-film transistor tft3 and the p-type thin-film transistor tft4 are formed by using the semiconductor layer as2, n-type impurity regions and p-type impurity regions are formed in each of the semiconductor layers as1 and as2.

An electrode T2 to be connected to the thin-film transistors tft1 and tft2 that incorporate the semiconductor layer as1 and an electrode T3 to be connected to the thin-film transistors tft3 and tft4 that incorporate the semiconductor layer as2 are formed with the same material (Al) as the gate signal lines GL at the same time as the gate signal lines GL are formed in the display area 13.

The electrode T2 is connected to the gate electrode GT2 that is formed on the semiconductor layer as2, and the electrode T3 is connected to a line (made of TiW in this embodiment) to which an output of the inverter is supplied.

An electrode T1 to become an input electrode of the inverter is formed so as to be connected to the gate electrode GT1 on the semiconductor layer as1 at the same time as the electrodes T2 and T3 are formed.

Then, a passivation film PSV is formed on the surface of the transparent substrate SUB1 in the area where the above inverters are formed. Those passivation films PSV are formed in the same manufacturing step as the passivation film PSV is formed in the display area 13.

A power line layer Vdd for supplying power to the inverter are formed on the surface of the passivation film PSV in the same manufacturing step as the drain signal lines DL are formed in the display area 13.

The power line layer Vdd is connected to the respective drain regions of the thin-film transistors tft2 and tft4 through contact holes that were formed in the passivation film PSV in advance.

A ground line layer GND as the ground of the inverter is formed at the same time as the power line layer Vdd is formed. The ground line layer GND is connected to the respective source regions of thin-film transistors tft1 and tft3 through contact holes that were formed in the passivation film PSV in advance.

In the above inverter of a driving circuit, no contact holes are formed in the input portion that is connected to the gate of the front-stage CMOS transistor, the connecting portion of the front-stage CMOS transistor, and the output portion that is connected to the rear-stage CMOS transistor. Therefore, the spaces occupied by those portions can be narrowed to a large extent.

Figure 6A:
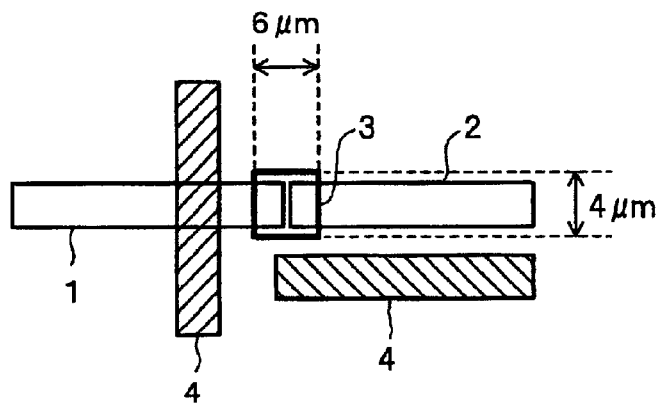
FIGS. 6A and 6B illustrate an advantage of the first embodiment.

FIG. 6A shows a relationship between an area (6 μm×4 μm in FIG. 6A) that is occupied by a connecting portion for electrically connecting two wiring layers 1 and 2 by means of a conductive layer 3 that is directly laid on the respective end portions of the two wiring layers 1 and 2 and other wiring layers (or electrodes) 4 that are adjacent to the connecting portion.

Figure 6B:
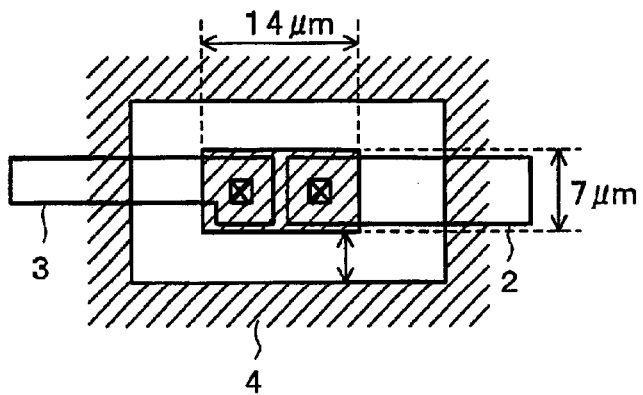

FIG. 6B shows a relationship between an area (14 μm×7 μm in FIG. 6B) that is occupied by a connecting portion for electrically connecting two wiring layers 2 and 3 contact holes that are formed at positions corresponding to the respective end portions of the two wiring layers 2 and 3 and another wiring layer (or an electrode) 4 that is adjacent to the connecting portion.

As seen from FIGS. 6A and 6B, the area of the former connecting portion is as small as 24 μm² whereas the area of the latter connecting portion is equal to 98 μm²; the space occupied by the connecting portion can be reduced to about 24%. Adjacent wiring layers (or electrodes) can be located as much closer to the connecting portion.

Figure 4:
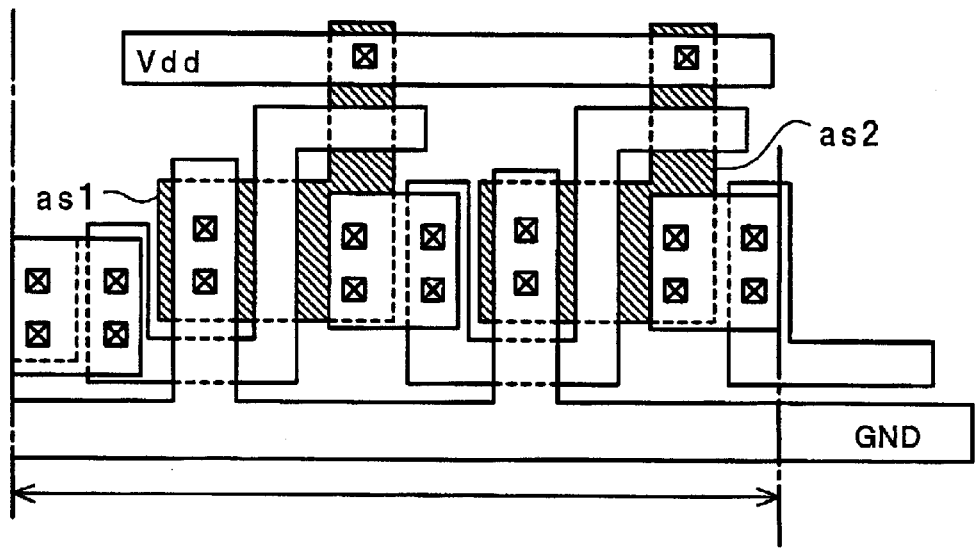
FIG. 4 a plan view showing each of inverters that constitute driving circuits of a conventional liquid crystal display device.

FIG. 4, which corresponds to FIG. 3, is a plan view of an inverter used in a conventional liquid crystal display device. As is apparent from the comparison with FIG. 4, the inverter that is configured according to this embodiment can reduce its occupation area to a large extent.

Embodiment 2

Figure 7A:
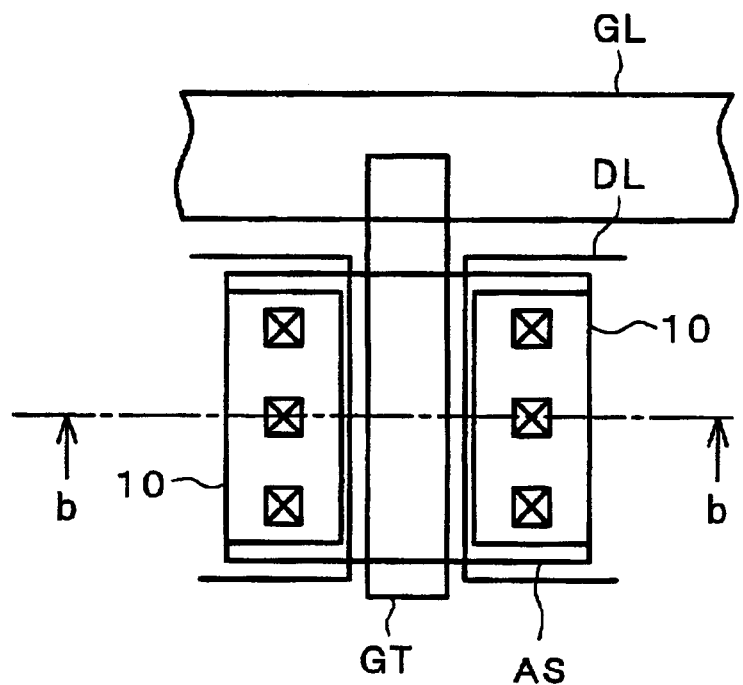
FIGS. 7A and FIG. 7B are a plan view and a sectional view, respectively, showing the structure of a thin-film transistor TFT in a pixel of a liquid crystal display device according to a second embodiment of the invention.
Figure 7B:
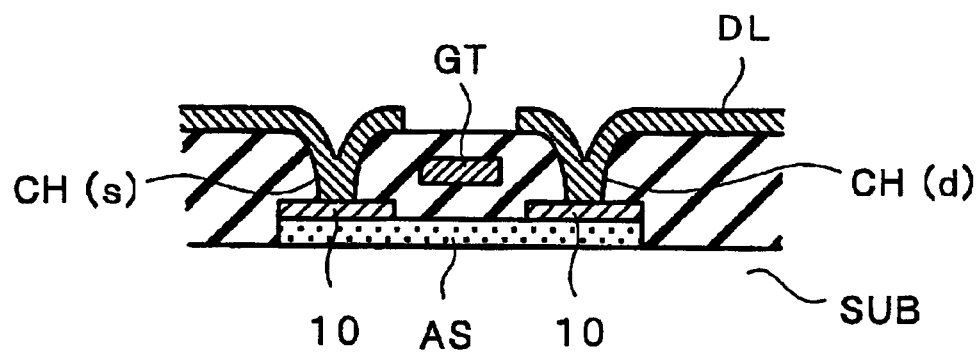

FIG. 7A and FIG. 7B show the structure of an important portion, that is, a thin-film transistor TFT formed in each pixel region, of a liquid crystal display device according to a second embodiment of the invention. FIG. 7A is a plan view and FIG. 7B is a sectional view taken along line b—b in FIG. 7A.

The second embodiment is different in configuration from the first embodiment in that metal layers 10 made of the same material (in this embodiment, Al) as the gate signal lines GL are directly laid on the surface of the semiconductor layer AS in the drain region and the source region and parts of the metal layers 10 are exposed through contact holes that are formed through the passivation film PSV.

With the above structure, dry etching can be used in forming contact holes through the passivation film PSV, whereby the diameter of the contact holes can be reduced and hence the integration density of pixels can be increased.

This will be described in more detail. It is known that when contact holes are formed through the passivation film PSV, the size of the contact holes become larger than the development size by about 2–3 μm by side etching.

Therefore, it is preferable to use dry etching in which the degree of side etching is low. However, where contact holes are formed through the protective film PSV by dry etching, there occurs a phenomenon that the etching does not stop at the surface of the semiconductor layer AS but etches it away. This is because of a small selective etching ratio of the passivation film PSV to the semiconductor layer AS is small.

Forming the metal layers 10 on the surface of the semiconductor layer AS in the above-described manner makes it possible to perform dry etching without damaging the semiconductor layer AS.

It goes without saying that the above structure can also be applied to the thin-film transistors tft of the inverters that constitute the drain signal line driving circuit 14 and the gate signal line driving circuits 15.

In the configuration shown in FIG. 3, metal layers are formed on the surfaces of the semiconductor layers as1 and as2 that should be connected to the power line layer Vdd and the ground line layer GND through the contact holes of the passivation film PSV.

The invention is not limited to the above embodiments. For example, the gate electrode GT of each thin-film transistor TFT need not always connected electrically to the associated top-side gate signal line GL by directly laying the latter on the former. As long as electrical connection is established, they may be connected to each other via another material or with some deviation.

The gate electrodes GT and the gate signal lines GL need not always be made of different materials. They may be made of the same material or materials of the same kind having different compositions. Also in this case, since the gate electrodes GT and the gate signal lines GL are formed in the different manufacturing steps, they have at least portions that are formed in different layers.

The invention can also be applied to general active matrix display devices having thin-film transistors such as the IPS liquid crystal display device using lateral electric fields and display devices other than liquid crystal display devices as exemplified by the organic EL display.

As is apparent from the above description, the active matrix display device according to the invention can increase the integration densities of the gate signal line driving circuit and the drain signal line driving circuit.

What is claimed is:

1. An active matrix display device comprising:
   a substrate having a gate signal line and a drain signal line;
   a thin film transistor that is driven being supplied with a scanning signal from the gate signal line, the thin-film transistor having a gate electrode that is made of a material different than the gate signal line and has a part of which is directly laid on or under the gate signal line to establish electrical connection, and a pixel electrode that is supplied with a video signal from the drain signal line via the thin-film transistor, wherein thin film metal layers are formed on a drain region and a source region, respectively, of the first thin-film transistor and/or each of the second thin-film transistors, and portions of the respective said thin film metal layers are exposed through respective contact holes that are formed through a passivation film that covers thin-film transistor, and wherein the metal layers are formed at the same time as a gate electrode of the thin-film transistor is formed.

2. An active matrix display device comprising:

a substrate having a gate signal line and a drain signal line;

a thin film transistor that is driven being supplied with a scanning signal from the gate signal line, the thin-film transistor having a gate electrode that is made of a material different than the gate signal line and has a part of which is electrically connected to the gate signal line, and a pixel electrode that is supplied with a video signal from the drain signal line via the thin-film transistor, wherein thin film metal layers are formed on a drain region and a source region, respectively, of the first thin-film transistor and/or each of the second thin-film transistors, and portions of the respective said thin film metal layers are exposed though respective contact holes that are formed through a passivation film that covers thin-film transistor, and wherein the metal layers are formed at the same time as a gate electrode of the thin-film transistor is formed.

3. An active matrix display device comprising:

a substrate having a gate signal line and a drain signal line;

a thin-film transistor that is driven being supplied with a scanning signal from the gate signal line, the thin-film transistor having a gate electrode that is made of a material different than the gate signal line and that overlaps with the gate signal line, and a pixel electrode that is supplied with a video signal from the drain signal line via the thin-film transistor, wherein thin film metal layers are formed on a drain region and a source region, respectively, of the first thin-film transistor and/or each of the second thin-film transistors, and portions of the respective said thin film metal layers are exposed through respective contact holes that are formed through a passivation film that covers thin-film transistor, and wherein the metal layers are formed at the same time as a gate electrode of the thin-film transistor is formed.

4. An active matrix display device comprising:

a substrate having a gate signal line and a drain signal line;

a thin-film transistor that is driven being supplied with a scanning signal from the gate signal line, the thin-film transistor having a gate electrode having a portion that is made of a layer different than the gate signal line and that is electrically connected to the gate signal line, and a pixel electrode that is supplied with a video signal from the drain signal line via the thin-film transistor, wherein thin film metal layers are formed on a drain region and a source region, respectively, of the first thin-film transistor and/or each of the second thin film transistors, and portions of the respective said thin film metal layers are exposed through respective contact holes that are formed through a passivation film that covers thin-film transistor, and wherein the metal layers are formed at the same time as a gate electrode of the thin-film transistor is formed.

* * * * *